United States Patent [19]
Albert et al.

[11] 3,920,442
[45] Nov. 18, 1975

[54] WATER-DISPERSIBLE PESTICIDE AGGREGATES

[75] Inventors: Robert Eyer Albert, Wilmington, Del.; Grant Barg Weed, Bountiful, Utah

[73] Assignee: E. I. Du Pont de Nemours & Co., Wilminton, Del.

[22] Filed: Apr. 3, 1974

[21] Appl. No.: 457,401

Related U.S. Application Data

[63] Continuation-in-part of Ser. No. 290,001, Sept. 18, 1972, abandoned, which is a continuation-in-part of Ser. No. 74,190, Sept. 21, 1970, abandoned.

[52] U.S. Cl. .......................... 71/92; 71/65; 71/79; 71/93; 71/118; 71/120; 71/121; 71/DIG. 1; 424/80; 424/127; 424/167; 424/269; 424/298; 424/304; 424/317; 424/341; 424/358; 424/361; 424/362

[51] Int. Cl.² ........................................ A01N 9/22

[58] Field of Search .................. 71/92, DIG. 1, 120; 424/80, 358, 361, 362

[56] References Cited
UNITED STATES PATENTS

| 3,060,084 | 10/1962 | Littler | 71/DIG. 1 |
| 3,149,953 | 9/1964 | Miller | 71/93 |
| 3,168,437 | 2/1965 | Galloway | 71/DIG. 1 |
| 3,424,571 | 1/1969 | Bondouy et al. | 71/120 |
| 3,657,446 | 4/1972 | Blackmore | 71/79 |
| 3,737,551 | 6/1973 | Karsten et al. | 71/DIG. 1 |

FOREIGN PATENTS OR APPLICATIONS

| 589,926 | 12/1959 | Canada | 71/DIG. 1 |

*Primary Examiner*—Glennon H. Hollrah

[57] ABSTRACT

Coherent, essentially isodimensional, free-flowing, water-soluble or water-dispersible pesticide aggregates which are resistant to attrition in shipping and storage and which will pass a U.S. Standard 10-mesh sieve and will be retained on a U.S. Standard 140-mesh sieve comprising a mixture of from 5 to 95% by weight of a pesticide or mixture of pesticides and from 5 to 40% by weight of a water-soluble binder-dispersant are useful for dry application or as aqueous sprays when dissolved or dispersed in water for control of undesirable agricultural pests.

The aggregates are prepared by contacting the finely divided solid ingredients in a fluidized bed with a fine spray of water or of a solution of the binder-dispersant followed by drying.

16 Claims, No Drawings

WATER-DISPERSIBLE PESTICIDE AGGREGATES

CROSS REFERENCE TO RELATED APPLICATION

This application is a continuation-in-part of my copending application Ser. No. 290,001, filed Sept. 18, 1972, now abandoned which is a continuation-in-part of my application Ser. No. 74,190, filed Sept. 21, 1970, now abandoned.

BACKGROUND OF THE INVENTION

Dispersible, soluble, or wettable powder formulations of pesticides are commonly used forms of pesticides available in the market. Such powders are intended for use as slurries or solutions which are to be sprayed on the target, using well-known techniques. These powders generally contain from about 20 to about 95% by weight active pesticide ingredient, up to about 80% by weight dispersible and/or soluble inert diluents such as clays, vermiculite, carbon black, sugar, and the like, and from 1–10% by weight of surfactants and dispersants for promoting rapid wetting and dispersing in water and dispersion stability in the spray tanks. Solutions and dispersions of a wide range of active ingredient concentrations from as low as 0.025% up to 10% or more have been used as sprays to distribute pesticides, applying as little as 2 oz./acre to 20 lb./acre or more, using total spray volumes of from less than 1 pint to as much as 500 gallons or more.

It is understood that as used here in the specification and claims the term "pesticide" is intended to refer to biologically active compositions containing chemicals which are effective in killing undesirable pests or preventing or controlling their growth. These pests may be plants, insects, mites, nematodes, microorganisms, algae, fungi, bacteria, and the like. The term pesticide may also refer to compositions or chemicals which control or modify the rate of growth or growth or mode of development of desirable plant species. All these chemicals and compositions are commonly known as herbicides, fungicides, insecticides, nematocides, miticides, virucides, algicides, bactericides, plant growth regulants, defoliants, insect attractants and repellents, and the like.

Various types of pesticides have been proposed and are currently in use. These materials are characterized by their ability to selectively attack or exterminate certain undesirable species of pests, while desirable plants or organisms are substantially unaffected and remain in a more or less vigorous and healthy state. These pesticide compositions include both organic and inorganic chemicals, some of the more common being:

methoxychlor [2,2-bis(p-methoxyphenyl)-1,1,1-trichloroethane]-trichloroethane] (0,0-dimethyl-0-p-nitrophenylphosphorothioate) EPN (0-ethyl-0-p-nitrophenyl, phenylphosphonothioate) methomyl (S-methyl-N-[(methylcarbamoyl)oxy]thioacetimidate) disulfoton 0,0-diethyl-S-2(ethylthioethylphosphorodithiate) DSMA (disodium salt, methane arsonic acid) diuron [3-(3,4-dichlorophenyl)-1,1-dimethylurea] 1-(p-cumyl)-3,3-dimethyl urea N-(2-methyl-4-chlorophenyl)-N',N'-dimethylformamidine and its hydrochloride salt
metribuzin [4-amino-6-tert-butyl-3-(methylthio)-as-triazin-5=(4H)one]
tetrachloroisophthalonitrile (chlorthalonile)
linuron [3-(3,4-dichlorophenyl)-1-methoxy-1-methylurea]
bromacil (5-bromo-3-sec-butyl-6-methyluracil)
ammonium sulfamate
lenacil (3-cyclohexyl-5,6-trimethyleneuracil)
monuron [3-(p-chlorophenyl)-1,1-dimethylurea]
neburon [1-n-butyl-3-(3,4-dichlorophenyl)-1-methylurea]
siduron [1-(2-methylcyclohexyl)-3-phenylurea]
terbacil (3-tert-butyl-5-chloro-6-methyluracil)
dimethylamine salt of trichlorobenzoic acid
trifluralin (α,α,α-trifluoro-2,6-dinitro-N,N-dipropyl-p=toluidine)
alachlor [2,2-chloro-2',6'-diethyl-N-(methoxymethyl)acetanilide]
benomyl [methyl-1-(butylcarbamoyl)-2-benzimidazolecarbamate]
chloroneb (1,4-dichloro-2,5-dimethoxybenzene)
ferbam (ferric dimethyldithiocarbamate)
maneb (manganese ethylene-bis-dithiocarbamate)
thiram (tetramethylthiuram disulfide)
zineb (zinc ethylene-bis-dithiocarbamate)
S-methyl-1-(dimethylcarbamoyl)-N-[(methylcarbamoyl)oxy]-thiolformimidate
methyl 2-benzimidazolecarbamate
3-cyclohexyl-1-methyl-6-dimethylamino-sym-triazine-2,4(1H,3H)=dione
2-cyano-2-hydroxyiminoacetamide and salts such as sodium salt
complex formed by reaction of equimolar portions of 3-(3,4=dichlorophenyl)-1,1-dimethyl urea and 5-bromo-3-sec butyl=6-methyl uracil
phosphonic acid, carbamoyl monoethyl ester, and salts such as ammonium salt
N-(1,1,2,2-tetrachloroethylthio)-3a,4,7,7a-tetrahydrophthalimide (captafol, "Difolatan")
Joint oxidation and precipitation product of ethylenebisdithiocarbamic acid with a soluble zinc salt (metiram, "Polyram")

The usual methods of making pesticide-containing powders involve milling of the ingredients either separately and then blending, or blending the ingredients followed by milling, or a combination. In order to ensure uniform blending, and especially because of the very fine particle sizes required, several millings, frequently involving hammer milling and fluid energy milling, are required. The resulting powders are composed of very fine particles, as small as a few microns in diameter or even smaller, and serious problems are encountered in handling the formulated pesticide powders. The fine powders are dusty and easily suspended in the air during handling of the open packages, for instance when measuring the required quantities into the spray tank in the field. These dusts are in some instances toxic and require special precautions by the user to avoid health and personal safety hazards, for example, the use of respirators to avoid inhalation of dusts. Even in cases where serious health and safety hazards are not present, these fine dusts can be skin irritants, particularly of the face and neck. Another problem presented by the dustiness of these powders, particularly under adverse wind conditions, is the unintentional but nevertheless serious possibility of contamination or damage to soil, water, or plant and animal life in the areas where application equipment is being charged. In addition, the fine powders are subject to "packing" during storage and shipping, resulting in products of widely varying bulk density which are difficult to pour and virtually impossible to measure with the required accuracy by volume techniques. Errors of up to ± 20% in measuring dosage, which commonly occur in practical use of pesticides, can result in inadequate control of the target pest by failing to put sufficient toxicant on the target and, conversely, possible damage to desirable species by overapplying the toxicant. Under- or over-applications, regardless of any possible damage, are uneconomical. Furthermore, mixtures of two or more powders each conaining a different pesticide are very difficult for the user or a local custom mixer to blend uniformly, even though it is desirable, for instance, to apply two insecticides or an insecticide and a fungicide as a single mixed commodity for greater convenience from the same spray.

Attempts to solve these problems have been made, and examples of granular products are contained in U.S. Pat. No. 3,168,437 (Feb. 2, 1965) and South African Patent Application 69/2353, filed May 2, 1969.

The products and methods for making these products in the aforementioned references are limited. The products still have some deficiencies which prevent them from meeting the combined requirements of the person applying the pesticide. The art process for making granules requires that the starting pesticide be a dry powder, and is further restricted to use of certain specific combinations of dry binder and diluents, such as calcium sulfate and a swelling clay, or a vegetable starch or hydrolyzed derivatives thereof.

In other attempts at making pesticide granules, it has been found that granules or agglomerates containing a pesticide or a mixture of pesticides prepared from the formulated wettable powders of the art using well-known agglomerating techniques such as the pan granulator of the above references, or extrusion techniques, and using only water as the agglomerating agent, followed by drying, are then not dispersible in additional water and do not form stable, fine suspensions suitable for spraying. Most conventional wetting and dispersing agents do not act in such compositions as suitable binders to give coherent, non-dusty granules which could be dispersed in water.

Furthermore, the size of granules made by conventional pesticide granulation techniques (e.g., pan granulator or extrusion) now commercially available, are too large and/or contain too low an active ingredient concentration to permit truly low volume application with uniform coverage. On the other hand, smaller agglomerates which are water-dispersible are not sufficiently resistant to attrition to a fine dust fraction upon handling and shipping. If conventional binders are added to make them strong, then they are not dispersible in water. Techniques such as tabletting, extrusion, and rolling which involve high-pressure compaction of moistened mixtures containing finely divided pesticides, diluents, binder, and dispersant, as described in U.S. Pat. No. 3,617,246, lead to dense pellets, tablets, plates, and rods which are subsequently dried and crushed. These techniques have also been used to form granules containing up to 50% of active pesticide. The resulting granules are not rapidly or completely water-dispersible and are not suitable for use in preparing sprayable suspensions.

U.S. Pats. Nos. 3,657,446 and 3,737,551 were cited in the parent. Both appear to be pertinent to our granules but have deficiencies in both granule products and process which are not present in our case.

U.S. Pat. No. 3,657,446 discloses and claims a process for making granules which requires spray-drying an emulsified mixture of an aqueous solution of lignin sulfonate and a solution of a pesticide in a water-immiscible solvent. The product is an intimate mixture of the spray-dried solids. The spray-dried product is ground and then agglomerated in a rotating drum while applying a fine water mist. Few pesticides can be handled practically or economically in this process because of poor solubility in water-immiscible solvents. The process requires evaporation of solutions containing up to 70% or more of solvents. Solvent recovery would be required. In general, agglomeration by tumbling as taught in this patent leads to granules with very poor dispersibility in water. U.S. Pat. No. 3,737,551 discloses and claims a process for preparing granules by spray-drying a slurry of solids including a pesticide in an aqueous solution of lignin sulfonate. The spray-dried products can be "spherical aggregates". In general, products resulting from spray-drying are finely divided powders or granules which are usually physically weak, hollow agglomerates, or, in other words, friable granules which would lack the physical strength to remain dust-free in normal handling and shipping.

SUMMARY OF THE INVENTION

This invention provides aggregates or granules containing one or more pesticides uniformly distributed throughout, which are resistant to attrition in shipping and storage, which are easily dispersible or soluble in water to provide sprayable slurries or solutions and which are free-flowing for easy measurement. The products of the invention can thus be used as dry granules and as aqueous sprays. The aggregates of this invention are coherent, predominantly isodimensional, free-flowing, non-dusty, and readily water-dispersible or -soluble. They can be prepared from finely divided pesticides, either technical material or formulated commodities, and accommodate a wide range of active ingredient content.

The aggregates of the invention are prepared by contacting finely divided pesticide and inert filler in a fluidized bed with a fine spray of a solution of water-soluble binder-dispersant, causing aggregation to take place, followed by drying. The aggregates comprise 5 to 95% by weight, preferably from 40 to 90% by weight, of uniformly distributed pesticide or mixtures of pesticides including herbicides, fungicides, nematicides, bactericides, insecticides, algicides, insect attractants, repellents, defoliants, plant growth regulants, and the like. The aggregates have as the binding agent from 0.5 to 40% by weight of one or more water-soluble binder-dispersants. The remainder of the aggregates can be surfactants and an inert filler or fillers such as clay, talc, vermiculite, sugar, or the like. The aggregates can contain from 0 to 90% inert diluents or formulating agents. The aggregates are in the size range of −10 to +140-mesh and preferably −14 to +60-mesh (U.S. Standard Sieve Series). The aggregates of this invention can also be prepared by blending dry, finely divided binder-dispersant with the finely divided pesticide and filler, fluidizing the mixture, and contacting the bed with a fine spray of water, causing aggregation to take place, followed by drying.

DESCRIPTION OF THE INVENTION a. Pesticides

Many pesticides are useful in preparing the pesticide-containing aggregates of this invention. The pesticides may be in the form of the pure compounds, high-strength technical materials, or commercial formulations which contain conventional diluents and formulating agents. Examples of suitable pesticides include bromacil, diuron, the bromacil-diuron complex, linuron, methomyl, and benomyl.

Techniques presently used to apply conventional low-strength pesticide-containing granules to the target are adequate for applying the low concentration aggregates of this invention. The water-soluble or water-dispersible aggregates of this invention are particularly useful for dry applications where it is desired to obtain rapid and complete availability and action of the pesticide shortly after applying and then to provide for rapid disappearance from the target area, particularly when herbicides are used for weed control in "no tillage" agricultural practices. The larger size range, —10 to +40 mesh or so is desirable when using aggregates with low pesticide content in dry application. A sufficient number of particles are available for uniform distribution over the target area.

The aggregates of high pesticide content, 20% by weight or more, and preferably more than about 40% by weight, are particularly useful for preparing aqueous dispersions, suspensions and solutions of pesticide or mixtures of pesticides for spray application by well-known methods. Usually it is most desirable to have the highest pesticide content in the aggregates that is consistent with formation of stable dispersions or suspensions for economic reasons, as well as to minimize fouling of piping and spray nozzles. For dry application, the aggregates of high-pesticide content, 20% by weight or more, are preferably in the finer size range, between —30 and +140-mesh, for optimum dry distribution over the target area.

b. Diluents

The aggregates of this invention can contain inert diluents or formulating agents in the range from 0 to 90% by weight. The diluents are used to adjust the pesticide content of the aggregates to a predetermined level and may also serve to prevent sticking or caking of the finished products. The diluents are pulverulent, inert substances which do not adversely affect the pesticide, which are nonphytotoxic to desirable plants, and nontoxic to other forms of life. Diluents with a wide range of chemical or mineralogical composition can be used. Examples of suitable diluents are: sub-bentonites, bentonites, attapulgites, kaolinites, montmorillonites, bauxite, hydrated or calcined aluminas, diatomaceous earths, pyrophyllites, Fuller's earth, talc, vermiculites, silicas, silicates, calcium carbonate, and the like. Organic materials are also suitable, for example, sugar, carbon, charcoal, wood flour, or ground corn cobs; and synthetic organic polymers may also be used.

The diluents are finely divided before agglomerating so that aggregates of the desired size range contain many of the original particles bonded together.

c. Binder-dispersants

The aggregates of this invention contain water-soluble binder-dispersants in the range from 0.5 to 40% by weight. The purpose of the binder-dispersant is two-fold: (1) to bind the particles of pesticide, diluent, and other adjuvants firmly together to form strong, coherent aggregates, and (2) to permit rapid and complete dissolution or dispersion of the particles in water to form uniform, stable dispersions or suspensions or solutions. The binder-dispersant can be either a single compound or a mixture of compounds which fulfill the binding and dispersing requirements. For example, polyvinyl acetate which is 86–91 mol percent hydrolyzed to polyvinyl alcohol or crude lignin sulfonates containing wood sugars fulfill all the requirements for a binder-dispersant. Sucrose which exhibits excellent binding properties may be combined with a dispersant such as carboxymethyl cellulose or polyvinylpyrrolidone and a wetting agent to fulfill the dispersing requirements.

As used herein, the term "binder-dispersant" is defined as a substance or a composition wich meets the following criteria. First, the material must be a binder. Binding ability is shown by placing a drop or two of an aqueous solution of the substance between the thumb and forefinger and gently rubbing together and alternately separating the thumb and fingertip, permitting the solution to evaporate. If the solution, when nearly evaporated to dryness, becomes "tacky", tending to cause the fingers to stick together, the substance is a binder. Excellent binders will form short fibers between the separated thumb and finger when evaporation is nearly complete. When evaporation is complete, a film of the candidate will form on the fingertips.

Second, the substance must be a dispersant in aqueous media. In most instances, the pesticide compounds are hydrophobic, and the fine particles tend to remain agglomerated or to flocculate when mixed into water without dispersant. In general, dispersants which contain a multiplicity of both oleophilic (organophilic) portions and hydrophilic portions in the molecule are suitable for the purpose of promoting and stabilizing dispersions and suspensions of finely divided, water-insoluble pesticides. Even in cases where the pesticide is water-soluble, the presence of the dispersant promotes disintegration of the agglomerates into small particles, which, by virtue of the high surface area resulting from disintegration, dissolve much more rapidly than without the dispersant. Furthermore, the presence of surfactant to lower the surface tension of the aqueous medium promotes rapid wetting and penetration of the aqueous phase into the interstices of the agglomerates, resulting in ever more rapid disintegration and dispersion of the agglomerated particles. The dispersant must not react chemically with the pesticide under conditions of agglomerating, drying, or storing.

Suitable binder-dispersants useful in this invention include:

a. cold-water soluble polyvinyl alcohol, produced by 86 to 91 mol percent hydrolysis of polyvinyl acetate;

b. polyvinyl pyrrolidone and its mixtures with sucrose;

c. methylcellulose and its mixtures with sucrose;

d. hydroxypropylmethylcellulose and its mixtures with sucrose;

e. lithium, potassium, sodium, magnesium, calcium, and ammonium salts of lignin sulfonic acids and compositions of such salts also containing 4.5 to 95.5 weight percent of at least one water-soluble carbohydrate selected from the group consisting of water-soluble sucrose, hexose, pentose, polymerized sugars, polysaccharides, degenerated cellulose and hemicellulose; and f. mixtures of sucrose with sodium salts of polymerized carboxylic acids and polyoxyethylene ethers of polyhydric alcohols which contain from about 10 to about 90 weight percent sucrose.

Preferred binder-dispersants are:

a. cold-water-soluble polyvinyl alcohol, produced by 86 to 91 mol percent hydrolysis of polyvinyl acetate having a molecular weight between 15,000 and 90,000;
b. polyvinyl pyrrolidone having a weight average molecular weight of between 15,000 and 160,000;
c. mixtures of sucrose with methylcellulose in which the methylcellulose has a weight average molecular weight of between 13,000 and 20,000 and forms 2% solutions in water which have a viscosity of 10–20 centipoises and in which the sucrose portion ranges from 0 to 80 weight percent;
d. mixtures of sucrose with hydroxypropylmethylcellulose in which the hydroxypropylmethylcellulose has a weight average molecular weight of between 18,000 and 26,000 and in which the sucrose portion ranges from 0 to 80 weight percent;
e. mixtures of sucrose with a sodium salt of carboxylated polyelectrolyte ("Daxadt" 30) or with a reaction product of glycerol with approximately 26 mols of ethylene oxide ("Ethosperse" G26) in which the sucrose content ranges from about 50 to 90 percent by weight;
f. commercial unrefined calcium or sodium lignin sulfonate containing 18–23 wt % of hexoses and pentoses (largely mannose, glucose, and xylose) and lesser amounts of arabinose, fructose, and galactose) with 5% of polymerized sugar, polysaccarides, degenerated cellulose and hemicellulose; and
g. mixtures of sucrose with sodium and calcium lignin sulfonate, containing from 10 to 90 weight percent of sucrose.

Most preferred binder-dispersants include:
a. cold-water-soluble polyvinyl alcohol, produced by 86 to 91 mol percent hydrolysis, having a molecular weight between 18,000 and 25,000;
b. polyvinyl pyrrolidone having a weight average molecular weight of between 30,000 and 50,000;
c. mixtures of sucrose with methylcellulose in which the methyl cellulose has a weight average molecular weight of between 13,000 and 16,000 and forms 2% solutions in water which have a viscosity of 10–17 centipoises and in which the sucrose portion ranges from 0 to 80 weight percent;
d. mixtures of sucrose with hydroxypropylmethylcellulose in which the hydroxypropylmethylcellulose has a weight average molecular weight of between 20,000 and 23,000 and in which the sucrose portion ranges from 0 to 80 weight percent;
e. commercial unrefined calcium or sodium lignin sulfonate containing 18–23 weight percent of hexoses and pentoses (largely mannose, glucose, and xylose) and lesser amounts of arabinose, fructose, and galactose) with 5 percent of polymerized sugar polysaccharides, degenerated cellulose and hemicellulose; and
f. mixtures of sucrose with sodium and calcium lignin sulfonate, containing from 10 to 90 weight percent of sucrose.

d. Aggregates

The aggregates of this invention are of uniform composition and are coherent, predominantly isodimensional, free-flowing, non-dusty, and water-soluble or water-dispersible.

As used in this application, "isodimensional" means approximately spherical. When an aggregate of this invention is measured under an optical microscope having a calibrated eyepiece, the ratio of the length of any one axis of the aggregate to the length of any perpendicular axis should not exceed 1.8 or more, preferably 1.5. This ratio is termed "the dimensionality ratio". At least 80 percent of the aggregates of this invention have maximum dimensionality ratios less than 1.8. It is this factor of isodimensionality which promotes the free-flowing nature of the aggregates of this invention.

By "coherent" it is meant that the aggregates are sufficiently strong to resist crushing, abrasion, or physical disintegration during storage and handling and to remain dust-free. To determine the coherence or strength of the aggregates, the following test procedure is used.

All sieves designated are U.S. Standard Sieve Series sizes. Aggregates passing a 10 mesh screen are separated into size fractions by sieving so the largest aggregate in any fraction has a diameter no more than 1.4 times larger than the smallest granule in the fraction. For example, in the fraction isolated between 10 and 14 mesh sieves, the largest aggregate has a diameter of approximately 2 mm. and the smallest aggregate has a diameter slightly larger than 1.4 mm. Other suitable sieve fractions can be isolated, for example, between 25 and 35 mesh sieves, 30 and 40 mesh sieves, 100 and 140 mesh sieves, etc. A three gram sample from the isolated size fraction is placed in an 8 oz. glass jar, 60 mm. O.D. × 54 mm. I.D. × 100 mm. long, fitted with a screw cap. One hundred and twenty ¼ inch diameter and fourteen ½ inch diameter steel balls are added to the jar, the jar is capped and is then placed in a rotating device such as a jar roller and rotated around its longitudinal axis at 25–26 r.p.m. for exactly two minutes.

The jar is removed from the roller, its contents discharged carefully to prevent further grinding of the remaining aggregates onto a nest of U.S. Standard sieves, consisting of a No. 10 sieve to remove the balls and a sieve in which the sieve opening is equal to the diameter of the smallest aggregates in the original sample, and a pan. The stacked sieves are gently rotated to separate the steel balls from the sample. The No. 10 sieve is then removed and the screening of the sample on the other sieve continued with rotation and tapping, until all the fines are collected in the pan. The fine material in the pan is weighed, and the weight percent of mechanical breakdown of the aggregates is calculated:

$$\frac{\text{weight of fines in grams} \times 100}{\text{sample weight in grams}}$$

Coherent aggregates will show mechanical breakdown or disintegration of 33 weight percent or less.

To determine the free-flowing character of the aggregates, an angle of repose test is used, as follows.

A sample of the material to be tested is carefully poured into a glass vial 25 mm. O.D. × 23 mm. I.D. × 100 mm. long. Sample is added until its depth in the vial is greater than about 40 but less than about 60 mm, with the longitudinal axis of the vial held vertically. The vial is capped and then carefully tilted without jarring until the longitudinal axis is horizontal, allowing the upper surface of material within the vial to seek its preferred configuration. In the case of free-flowing material, this configuration is a plane surface tilted with respect to the horizontal plane. Non-free-flowing materials tend to form an "S"-shaped warped surface, with the upper and lower portions assuming a relatively high angle with the horizontal plane. The angle of the projected plane of the surface of the sample intersecting the horizontal plane is measured, and free-flowing materials defined as those whose surface forms an angle of 45° or less with the horizontal plane.

Water-dispersibility is an essential characteristic of the aggregates of this invention. Dispersibility of the aggregates containing water-insoluble ingredients in excess of about 10% is determined as follows.

One gram of the material to be tested is placed in a 30 ml. tall form "Pyrex" beaker containing 15 ml. of distilled water, and stirred for 60 seconds using a "Teflon" polytetrafluoroethylene coated magnetic stirring bar ¼ inch dia. × 1 inch long, driven by a magnetic stirrer at 300 r.p.m. The stirrer is stopped and the stirring bar removed and rinsed with a small stream of distilled water, using approximately 1 ml. of water. The suspension or dispersion is immediately and quickly poured into the assembled settling tube containing 200 ml. of distilled water, rinsing all solids from the beaker with a small stream of distilled water, using 3–5 ml.

The settling tube assembly consists of a 6.5 ml. centrifuge tube graduated from the lower end tip to 0.4 ml. in 0.01 ml. divisions (A. H. Thomas Co., Philadelphia, Pa., "Cat. No. 2998-655" or equivalent) with the neck consisting of the female part of a 19/22 standard taper joint. The male half of the taper joint is attached to the lower end of a long open Pyrex tube 19 mm. O.D. × 17 mm. I.D. and inserted into the female half of the centrifuge tube. The assembly is about 1030 mm. from the tip of the centrifuge tube to the upper end of the open Pyrex tube. The Pyrex tube is marked to correspond to 200 ml. total volume, about 900 ± 25 mm. from the tip of the centrifuge tube. The assembly is held so that the longitudinal axis is vertical, before the tube is filled to the 200 ml. mark with distilled water.

The rate of settling of the suspended solids and the volume of settled solids is noted 1, 3, and 5 minutes after pouring the suspension or dispersion into the settling tube assembly. Excellent dispersibility is observed when the volume of settled solids after 5 minutes is less than about 0.01 ml., although acceptable dispersibility is observed for materials which show a volume of settled solid of about 0.1 ml. after 5 minutes.

To determine rate of dissolution of aggregates containing less than about 10 weight percent of water-insoluble ingredients, the following test is used.

One gram of aggregates is added to a 400 ml. Pyrex beaker containing 250 ml. of water stirred at 300 r.p.m. with a quarter-inch diameter by 1½ inch long Teflon polytetrafluoroethylene-coated magnetic stirring bar. The time from adding the aggregates to the stirred water until all solubles have gone into solution is observed. Dissolution times of less than about 2 minutes indicate excellent rate of dissolution, although dissolution times of up to 10 minutes are acceptable.

By the term uniform composition it is meant that all of the constituents of the aggregates of this invention are intimately mixed and distributed evenly throughout the aggregate. Thus, any dust abraded from the surface of the aggregates will have approximately the same chemical composition as the remainder of the granule.

The usual finely divided wettable pesticide-containing powders of the art are dusty and easily scattered and blown about by even slight breezes. Such dusts present health and safety hazards to the user and their elimination is highly desirable. Therefore, non-dusty aggregates are desirable for handling safety, especially under adverse wind conditions in the field. The aggregates of this invention accomplish this result. The coherence of the aggregates prevents formation of fines during storage, shipping, and handling. Because the aggregates are predominantly isodimensional, they are free-flowing and resist packing together to form high density lumps. Hence they pour smoothly from a package, making possible much more accurate measuring of the required amount of pesticide using volume techniques. Weighing is very inconvenient in the field, and is not usually used. The volume measurement of conventional wettable powders often results in large errors in amounts of pesticide applied, so that the desired results are not obtaied.

Preparation

The aggregates of this invention are prepared by contacting finely divided pesticide and binder-dispersant with a finely atomized spray while the pesticide is fluidized by a stream of gas. The granules form in the fluidized bed and are then dried by continued fluidization in the gas stream.

The pesticide starting material may be one or more of the conventional dusts, dust concentrates, or wettable powders prepared by conventional methods from pesticides, diluents, surface-active agents, etc., which are blended and then milled. The starting material may also be unformulated technical pesticide.

Thus, the pesticide may be blended with inert diluent and binder-dispersant in dry form, and if necessary to obtain the fine particle size, usually less than 150 microns, the mixture is ground. The powder is fluidized in a stream of gas, usually air; and a fine spray of water, preferably an atomized spray, is added into the fluid bed to form the small, isodimensional aggregates. The wet aggregates are then dried by the stream of fluidizing gas. During all or portions of the process, the air may be heated to a temperature below the decomposition temperature of the ingredients and, preferably, also below the sintering temperature of the composition.

The aggregates can also be prepared by adding a fine spray of a solution, preferably an aqueous solution, of the binder-dispersant to the fluidized bed of the component powders. In order to avoid the formation of large aggregates, the binder-dispersant solution is best added as an atomized spray.

The precise conditions which produce aggregates in the desired size range must be determined for each combination of pesticide starting materials and binder-dispersants in order to minimize the proportion of oversize and undersize material. This can be done readily by one skilled in the art by visual observation of aggregate sizes or by a screening check.

In some case, particularly when the pesticides and/or diluents are soluble or emulsifiable in the binder solvent, it may be preferable to add some or all of the pesticide and/or diluent to the binder-dispersant solution which is sprayed onto the agitated bed of dry ingredients.

The aggregates are dried, preferably using a stream of air heated to a temperature below the decomposition temperature of the ingredients, screened, and those that pass a U.S. Standard 140 mesh sieve are recycled through the process. There may also be a small fraction of oversize material, greater than 10 mesh, and this portion requires crushing to finer material before it can be recycled. The use of too much water or too high local concentration of water frequently leads to the formation of large aggregates. A description of the preferred fluidized bed process using an atomized spray of aqueous binder-dispersant is given in Example 1.

In some instances, it may be desirable to coat the aggregate while still in the fluidized bed by spraying the agglomerates with a solution or slurry of a suitable coating material.

U.S. Pat. No. 3,207,842 describes fluidized bed equipment suitable for preparing the agglomerates of this invention. (Commercial size fluidized bed equipment is available from Chemical and Pharmaceutical Co., 260 West Broadway, New York, N.Y. 10017, and from Aeromatic AB, CH-4132 Muttenz, Farsburger Str. 6, Switzerland.)

In order that those skilled in the art may better understand the compositions of the agglomerates of this invention, the following specific examples are set forth. In the examples, the amounts of the various components are given in parts by weight.

EXAMPLE 1

One hundred parts of a wettable powder formulation containing 80% by weight of 5-bromo-3-sec-butyl-6-methyluracil, and having substantially no material larger than about 150 microns and less than about 6% larger than 44 microns, is charged to the conical air expansion section of a fluidized bed agglomerator.

The agglomerator consists of 5 principal sections:

1. A lower conical air expansion section, 6 inches long, increasing from 1 inch diameter at the bottom end to 3 inch diameter at the upper end and fitted at the bottom with an air inlet chamber 2 inches long by 1 inch diameter. The air inlet chamber is provided with a means to admit fluidizing air. A DeVilbiss No. 152 atomizing nozzle is mounted coaxially in the air inlet chamber with the discharge end extending one-half inch above the top of the chamber and into the expansion section. Air at 20 psig is connected to the air inlet of the atomizer while the liquid inlet is connected to a reservoir of an aqueous binder-dispersant solution. The air inlet chamber and expansion section are made of 16 ga. 304 stainless steel.

2. A fluidizing section connected to the air expansion section in such a manner that no air escapes between adjacent sections, consisting of a "Lucite" acrylic tube 3 inch O.D. × 2¾ inch I.D. × 7 inches long is mounted coaxially immediately above the expansion section.

3. A second expansion section 3 inches in diameter at the lower end and 6 inches in diameter at the upper end, and 7 inches long, made of galvanized steel sheet is mounted above and coaxially with the fluidizing section.

4. A disengaging section to permit separation of the fluidized air and the agglomerated powder, made of Lucite 6 inch O.D. × 5½ inch I.D. is mounted above and coaxially with the upper expansion section.

5. A cylindrical dust filter, 6 inch diameter by 14 inches long, sealed at the upper end, made of fiber-reinforced double thickness paper towel (golf towel) is attached to the top end of the disengaging section in such a manner that the air is forced to pass through the filter before escaping into a fume hood.

The entire assembly is rigidly mounted with the axis vertical and arranged with the air inlet chamber at the lower end and the filter uppermost. The entire assembly is about 35 inches long.

Fluidizing air is admitted to the air inlet chamber at about 10 psig and the pesticide powder gently fluidized. Atomizing air is applied to the atomizer and aqueous binder solution containing 40% by weight of "Lignosol" B-D calcium lignin sulfonate, containing about 20% by weight of hexoses and pentoses and 5% by weight of other water-soluble carbohydrates, obtained from Wyroogh and Loser, Inc., 2 Brunswick Circle Ext., Trenton, N.J. is admitted to the liquid inlet of the atomizer from the reservoir. Fluidizing air pressure is gradually raised to 15 psig during the addition of 31.1 parts of the binder solution, thus a total of 12.4 parts of binder (11.04% based on total of pesticide powder and binder) are added.

The pesticide aggregates are dried in a stream of room temperature air for 16 hours and screened. The screen analysis is:

| Fraction, U.S. Std. Sieve | Wt. % | Average Dimensionality Ratios | | |
|---|---|---|---|---|
| | | Long Axis | 2nd Axis | Short Axis |
| +45 | 7.2 | 1.75 | 1.4 | 1.0 |
| −45 +140 | 61.0 | 1.6 | 1.25 | 1.0 |
| −140 | 31.8 | — | — | — |

The dimensionality ratios are calculated by measuring the lengths of three mutually perpendicular axes of a number of individual aggregate particles and normalizing these lengths by dividing each by the length of the smallest axis. The average is calculated for 80% of the particles showing the smallest long axis ratio.

Less than 4% fines are obtained in the coherence test and the angle of repose is 34°. The volume of settled solids in the dispersibility test is about 0.1 ml.

22.4 Kilograms of the aggregates in the +45 −140 mesh size range are dispersed in 100 gallons of water and applied to 1 hectare of a wide variety of broadleaf and grass species along a railroad right-of-way. Excellent control of annual ryegrass (*Lodium multiflorum*), bromegrass (*Bromus enirmus*), common ragweed (*Ambrosia artemisifolia*), henbit (*Lamium amplexicaule*), speedwells (*Veronica officinalis*), golden rod (*Solidago rugosa*), asters (*Aster pilosus*), and buckhorn plantain (*Plantago Lanciolata*), is noted during spring application to young and growing weeds.

EXAMPLE 2

Ninety-eight parts of formulated powder, 100% passing a 100 mesh screen U.S. Standard Sieve), containing 95% by weight of S-methyl-N-[(methylcarbamoyl)oxy]thioacetimidate, is charged to the fluidized bed agglomerator of Example 1. In this instance, the atomizer, a No. 152 DeVilbiss atomizer, is directed downward and positioned axially in the disengaging section with the discharge tip 3 inch inches the lower end of the section.

The insecticide powder is fluidized by admitting air, warmed to 53°C. at 5 psig to the air inlet section. Air as in Example 1 is admitted to the atomizer and 26.2 parts of aqueous binder solution containing 45% by weight of Lignosol B-D calcium lignin sulfonate of Example 1 are admitted through the liquid inlet of the atomizer. Thus, 11.8 parts of binder are added (10.72% binder based on total of pesticide powder and dry binder). The fluidizing air pressure is gradually increased to 26 psig during addition of the binder.

The fluidization is continued for 10 minutes after the final binder addition, at which time the temperature of the air inlet section of the fluidizer warms to about 35°C. Fluidization is stopped and the dried aggregates removed. The moisture content of the aggregates is 0.2% by weight.

The dried aggregates are screened and show the following analysis:

| Fraction, U.S. Std. Sieve | Wt. % | Average Dimensionality Ratios | | |
|---|---|---|---|---|
| | | Long Axis | 2nd Axis | Short Axis |
| −20 +100 | 73.5 | 1.7 | 1.3 | 1.0 |
| −100 | 26.5 | — | — | — |

Less than 5% fines are produced in the coherence test, and the angle of repose of the aggregates is 36°. The aggregates are soluble when stirred for several minutes in water at 5°C. and contain 91% by weight active ingredient.

0.265 lb. of the aggregates in the −20 +100 mesh size range containing 0.25 lb. of S-methyl-N-[(methylcarbamoyl)-oxy]thioacetimidate are dissolved in 100 gallons of water and applied as a wetting spray to cabbage plants on which cabbage loopers (*Frichoplusia ni*), are feeding. All cabbage loopers are killed by this spray.

EXAMPLE 3

9.4 Parts of formulated wettable powder containing 80% by weight of manganese ethylene-bis-dithiocarbamate and having substantially all of the material smaller in size than 150 microns and 90.6 parts of fine (smaller than 44 microns) A-3 calcined alumina (Aluminum Company of America) are charged to the fluidized bed agglomerator of Example 2. The powder mixture is fluidized by admitting air at 60°C. and 5 psig to the air inlet section. Air as in Example 2 is admitted to the air inlet of the atomizer, and 20 parts of aqueous binder-dispersant solution containing forty percent by weight of Lignosol SFX, sodium lignin sulfonate containing about 4.5 percent by weight of polymerized sugars, polysaccharides, degenerated cellulose and hemicellulose, obtained from Wyroogh & Loser, Inc. 2 Brunswick Circle Ext., Trenton, N.J. are admitted through the liquid inlet of the atomizer; thus, 12.0 parts of binder-dispersant are added. Fluidizing air pressure is gradually raised to 20 psig during addition of the binder.

Fluidization is continued for 15 minutes after final binder addition, at which time the temperature of air inlet section of the atomizer warms to about 40°C. Fluidization is stopped and the dry aggregates removed.

The dried aggregates are screened and show the following analysis:

| Fraction, U.S. Std. Sieve | Wt. % | Average Dimensionality Ratios | | |
|---|---|---|---|---|
| | | Long Axis | 2nd Axis | Short Axis |
| −10 +140 | 66 | 1.6 | 1.5 | 1.0 |
| −140 | 34 | — | — | — |

Less than 10% fines is observed in the coherence test, and the angle of repose of the material is 41°. 0.015 ml. of settled material is observed in the dispersion test.

2.1 lb. of the aggregates in the −10 +140 mesh size range are dispersed in 100 gallons of water and sprayed onto mature tomato plants. Excellent control of tomato late blight (*Phytophtora infestans*) is shown by the treated plants as compared to adjacent but untreated plants which are badly affected by late blight.

EXAMPLE 4

One hundred parts of methyl-1-(butylcarbamoyl)-2-benzimidazolecarbamate, 100 parts of sucrose and 10 parts of sodium isopropyl naphthalene sulfonate are air milled to produce a fine powder of which 100% passes a 350 mesh U.S. Standard sieve. One hundred fifty parts of this powder are placed into the fluidized bed agglomerator of Example 2 and fluidized by admitting air at 5 psig and 55°C. Eighty parts of an aqueous binder solution containing 50% by weight of sodium lignin sulfonate binder-dispersant of Example 3 are admitted through the atomizer as in Example 2. During addition of the binder solution, the pressure on the air inlet of the fluidizer is gradually increased to 30 psig. After addition of the binder solution, fluidization is continued for 20 minutes, with the air at 55°C. and the aggregates are dried. The −20 +140 mesh fraction of the dried aggregates, 65 weight percent of the total, shows less than 15% disintegration in the coherence test, with average dimensionality ratios for the long axis, 2nd axis and short axis respectively of 1.4, 1.2 and 1.0 and the angle of repose is 39°. Settled solids in the dispersion test is 0.01 ml.

1.25 lb. of the agglomerates in the −20 to +140 mesh size range are dispersed in 100 gallons of water and sprayed to run-off onto sugar beets infected with sugar beet leaf spot (*Cercospera beticola*). The treated plants remain strong and healthy, and are larger than adjacent but untreated plants which are severely damaged by the fungus.

EXAMPLE 5

Ten parts of the milled mixture of methyl-1-(butylcarbamoyl-2-benzimidazolecarbamate, sucrose and surfactant of Example 4, and 100 parts of the formulated wettable powder of Example 3 are placed in the fluidized agglomerator bed of Example 2 and fluidized by admitting air to the fluidizer at 5 psig and 50°C. Forty-one parts of an aqueous solution of the binder-dispersant of Example 1 are admitted through the atomizer. The pressure on the air inlet to the fluidizer is gradually increased to 35 psig during addition of the binder. Fluidization with the air at 55°C. is continued for 15 minutes after the addition of binder, and the aggregates are dried.

The −10 +140 mesh size fraction of the aggregates is 45% by weight of the total with the average dimensionality ratios for the long axis, 2nd axis and short axis of 1.7, 1.4 and 1.0 respectively. These aggregates show about 20% disintegration in the coherence test and an angle of repose of 40°. Settled solids in the dispersion test is 0.02 ml.

These aggregates are used to make up a sprayable suspension which is applied to grape vines and which protects them from powdery mildew.

1.5 Lbs. of −10 +140 mesh size fraction of the aggregates are dispersed in 100 gallons of water and sprayed to run-off onto grape vines severely infected with both downy mildew (*Plasmopara uitacola*) and powdery mildew (*Uncinula necator*). The treated vines quickly regain their color and vigor, and all signals of the infection disappear. The treatment is repeated when signs of infection reappear and vines remain vigorous. Adjacent but untreated vines are severely hindered by infection and yield of grapes is sharply reduced.

EXAMPLE 6

One hundred twenty-five parts of a finely divided, wettable powder formulation containing 65 percent by weight of tetramethylthiuram disulfide is placed in the fluidized bed agglomerator of Example 2 and fluidized by admitting air at 5 p.s.i.g. and 50°C. Sixty-two parts of the binder-dispersant solution of Example 1 are admitted through the atomizer and the fluidizing air pressure gradually raised to 25 p.s.i.g. during this addition.

The dried aggregates consist of 40% by weight of a −20 +140 mesh fraction and 60% by weight of −140 mesh with the average dimensionality ratios of the long, 2nd and short axes of 1.25, 1.1 and 1.0 respectively. The −20 +140 mesh aggregates show 15% disintegration in the coherence test and an angle of repose of 42°; 0.1 ml. of settled solids are observed in the dispersion test.

4.5 lb. of the aggregates larger than 140 mesh are dispersed in 100 gallons of water and sprayed to run-off onto apple trees. Excellent control of apple scab (*Venturia inaequalis*) is observed on apples from the sprayed trees as compared to apples from similar but unsprayed trees in the same plot.

EXAMPLE 7

One hundred parts of a wettable powder formulation containing 80% by weight of 3-(p-chlorophenyl)-1,1-dimethylurea, in which at least 96% of the material is smaller than 44 microns in size, is placed in the fluidized bed agglomerator of Example 1 and fluidized by admitting fluidizing air at 10 p.s.i.g. and 25°C. Twenty-eight parts of binder-dispersant solution of Example 1 are admitted through the atomizer, gradually raising the pressure of the fluidizing air to 15 p.s.i.g. The aggregates are removed from the fluidizer and dried 16 hours in flowing air at 25°C. The dried aggregates are screened and show 5% by weight of agglomerates of +45 mesh, 59% by weight of −45 +140 mesh, and 36% by weight of −140 mesh. The −45 +140 mesh aggregate fraction exhibits less than 2% disintegration in the coherence test, average dimensionality ratios for the long, 2nd and short axes of 1.75, 1.25 and 1.0 respectively, and an angle of repose of 35°. The settled solids observed in the dispersion test are 0.02 ml.

1.4 Kilograms of the −45 +140 mesh size range aggregates are dispersed in 300 liters of water. The entire sprayable suspension is applied as layby spray on cotton. Excellent control of crabgrass (*Digitaria sanguinalis*), seedling Johnson grass (*Sorghum halepense*), goosegrass (*Eleusine indica*), lambsquarter (*Chenopodium album*), seedling morning glory (*Convoluvus arvensis*) is observed.

EXAMPLE 8

One hundred parts of formulated wettable powder containing 80% by weight of 3-(3,4-dichlorophenyl)-1,1-dimethylurea in which at least 96% of the material is present as particles smaller than 44 microns are placed in the fluidized bed agglomerator of Example 1 and fluidized as in Example 7. Twenty-five parts of the binder-dispersant solution are admitted through the atomizer, as in Example 7. The aggregates are screened and show 5% by weight of +45 mesh, 57% by weight −45 +140 mesh, and 38% by weight −140 mesh. The −45 +140 mesh aggregate fraction exhibits less than 1% disintegration in the coherance test, average dimensionality ratios for the long, second, and short axes respectively of 1.4, 1.2, and 1.0 and an angle of repose of 35°. The settled solids in the dispersion test are 0.01 ml.

Four kilograms of the −45 +140 mesh size range of the aggregates are dispersed in 200 liters of water and applied as a spray to 1 hectare asparagus before the first spears appear in the spring. Excellent control of crabgrass (*Digitaria sanguinalis*), foxtail (*Setaria viridis*), henbit (*Lamium amplexicaule*), chickweed (*Stellaria media*), and common ragweed (*Ambrosia artemisiifolia*) is noted throughout the growing seasosn. Nearby but untreated plots are severely infested with the weeds and yields are greatly reduced.

EXAMPLE 9

One hundred parts of a well-ground formulated wettable powder containing 80% by weight of 3-(3,4-dichlorophenyl)-1-methoxy-1-methylurea is placed in the fluidized bed agglomerator of Example 2 and fluidized by admitting fluidizing air at 5 p.s.i.g. and 25°C. 45.2 parts of aqueous binder-dispersant solution of Example 1, but containing 45% by weight of the binder-dispersant, are admitted through the atomizer. Fluidizing air pressure is gradually increased to 20 p.s.i.g. during addition of the binder solution. The aggregates are removed from the fluidizer and dried 16 hours in air at 25°C. The dried agglomerates are screened and show 0.2% by weight of +25 mesh, 51.3 percent by weight of −25 +100 mesh and 48.5% by weight −100 mesh. The −25 +100 mesh aggregate fraction exhibits less than 1% disintegration in the coherance test, average dimensionality ratios for the long, 2nd and short axes respectively of 1.6, 1.3 and 1.0 and an angle of respose of 37°. The settled solids in the dispersibility test are 0.01 ml.

Two kilograms of the −25 +100 mesh size range of the aggregates are dispersed in 100 gal. of water and applied as a preemergence herbicidal spray on corn planted in a Keyport silt loam. During the growing season excellent control of a wide variety of grasses and broadleaf species is observed. Complete control of crabgrass (*Digitaria sanguinalis*), barnyard grass (*Echinochola crusgalli*), carpetweed (*Mollugo vericillata*) and pigweed (*Amaranthus retroflexus*) is noted. Nearby, similar but untreated stands of corn are severely infested with these species, and the plants are weak, with greatly reduced yields.

EXAMPLE 10

Fifteen parts of an air-milled wettable powder formulation containing 65% by weight of 1,4-dichloro-2,5-dimethoxybenzene in which 99.9% of the material is finer than 200 mesh and 85 parts of −325 mesh attapulgite clay are placed in the fluidized bed agglomerator of Example 1 and fluidized by admitting air at 5 psig and 50°C. Thirty-five parts of binder-dispersant solution of Example 1 are admitted through the atomizer, gradually raising the pressure of the fluidizing air to 15 psig. Fluidization using air at 50°C. is continued for about 15 minutes following addition of the binder-dispersant, and the dried aggregates are screened and 60% by weight are in the size range −10 +45 mesh with average dimensionality ratios for the long, 2nd and short axes of 1.45, 1.2 and 1.0 respectively. The −10 +45 mesh fraction exhibits less than 1% disintegration in the coherence test, average dimensionality ratios for the long, 2 nd and short axes respectively of 1.45, 1.2 and 1.0, and the angle of repose is 32°. The settled solids observed in the dispersion test are 0.02 ml.

Twelve kilograms of the −10 +45 mesh aggregates are uniformly distributed in the row during planting of 1 hectare of cotton by a precision granule distributor in a band about 15 cm. wide. The seed and aggregates are then covered with infected soil and the seed allowed to germinate. Excellent control of fungi Pythium and Rhizoctonia is observed with an excellent stand of cotton. Cotton stands of only 50% as great are achieved in nearby but untreated plots planted with the same seed used in the infected soil.

EXAMPLE 11

Fifty parts of S-methyl-N-[(methylcarbamoyl)oxy]-thioacetimidate and 150 parts of Blue "Panther Creek" Southern bentonite, an uncalcined, smectite-containing clay, are air milled to produce a fine powder of which 100% passes a 350 mesh U.S. standard sieve. One hundred and fifty parts of this powder are placed in the fluidized bed agglomerator of Example 2 and fluidized by admitting air at 5 psig and 50°C. Eighty parts of an aqueous binder solution containing 45% by weight of Lignosol B-D calcium lignin sulfonate of Example 1 are admitted through the liquid inlet of the atomizer. During addition of the binder solution, the pressure of the air inlet of the fluidizer is gradually increased to 30 psig. After addition of the binder solution, fluidization is continued for 20 minutes, with the air at 50°C. and the aggregates are dried. The −40 +140 mesh fraction of the dried aggregates, 60 weight percent of the total, shows less than 15% disintegration in the coherance test, with average dimensionality ratios for the long axis, second axis and short axis, respectively, of 1.5, 1.3 and 1.0 and an angle of repose of 35°. The volume of settled solids in the dispersion test is 0.02 ml.

1.25 Pounds of the aggregates in the −40 +140 mesh size range containing 0.25 lb. of S-methyl-N-[(methylcarbamoyl)oxy]thioacetimidate are dissolved in 100 gallons of water and applied as a wetting spray to cabbage plants on which cabbage loopers (*Frichophusia ni*), are feeding. All the cabbage loopers are killed by this spray.

EXAMPLE 12

One hundred parts of the milled mixture of methyl-1-(butylcarbamoyl)-2-benzimidazolecarbamate, sucrose and surfactant of Example 4 are placed in the fluid bed agglomerator of Example 2 and fluidized by admitting air at 5 psig and 45°C. 34.8 Parts of an aqueous binder-dispersant solution comprising 10 parts sucrose; 5 parts methylated cellulose ("Methocel" 15 cps, obtained from Dow Chemical Company, Midland, Mich.); and 1 part 85% dioctyl sodium sulfosuccinate ("Aerosol" OT-B, obtained from American Cyanamid Co., Industrial Chemicals Div., Beradan Ave., Wayne, NJ 07470) are admitted through the atomizer. The pressure on the air lines to the fluidizer is gradually increased to 25 psig during addition of the binder. Fluidization with the air maintained at 45°C. is continued for 20 min. after addition of the binders to dry the agglomerates.

The −10 to +100 mesh size fraction of the aggregates is 90.3% by weight of the total with average dimensionality ratios for the long axis of 1.65. These aggregates show about 24% disintegration in the coherence test and an angle of repose of 37.5°. Settled solids in the dispersion test is 0.08 ml.

EXAMPLE 13

This example is presented to illustrate the effect of the process on the properties of the granules.

In accordance with Duyfjes, U.S. Pat. No. 3,617,246 a mixture containing 237 parts of technical linuron containing 99.0% 3-(3,4-dichlorophenyl)-1-methoxy-1-methyl urea, 5.3 parts of sodium lauryl sulfate surfactant ("Duponol" ME, obtained from E. I. du Pont de Nemours and Co., Inc., Wilmington, DE) and 258 parts of agricultural grade dolomitic limestone is blended and pulverized in a swing-hammer mill to a ground product of which 0.2 weight percent is retained on a 60 mesh screen, 2.1 weight percent is retained on a 100 mesh screen, 6.1 weight percent is retained on a 200 mesh sceen and 73.0 weight percent passes a 325 mesh screen. To 95 parts of the pulverized mixture is added 5 parts of the calcium lignin sulfonate binder-dispersant of Example 1 and this mixture is thoroughly blended. Five parts of water is sprayed in fine droplets on the binder containing mixture while being rapidly agitated. A crumbly mass results. The crumbly mixture is then pressed into disks 3.5 cm in diameter by 0.32 cm thick under a pressure of 800–1000 kg/cm². Hard, coherent apparently dry disks result. The disks are crushed and screened to recover granules in the −25 +60 weight percent size range. These granules are labeled A.

Another portion of 125 parts of the pulverized mixture is placed in the fluidized bed agglomerating apparatus of Example 1 and fluidized by admitting air at 5 psig at 75°C to the fluidizer, 32.4 parts of an aqueous solution containing 33% of the binder-dispersant of Example 1 are admitted through the atomizer. The fluidizing air pressure is gradually increased to 35 psig during addition of the binder. Fluidization with air at 75°C is continued for 10 minutes to dry the agglomerates. The agglomerates are screened to recover the −25 +60 mesh size fraction. These agglomerates are labeled B.

The granules A and agglomerates B are found to exhibit the following properties:

| | Dispersibility Settled Solids ml after 1 min.* | Flowability Angle of Repose | Coherence wt% Disintegration | Isodimensionality Long:Short Axis Ratio |
|---|---|---|---|---|
| Granules, A | 1.20 | 42.4 | 31.6 | 1.82 |
| Agglomerates, B | 0.01 | 32.5 | 10.0 | 1.5 |

*Test discontinued at 1 minute. All of suspended solids of Granules, A, settled before 1 min.

This example clearly shows the superior dispersibility, flowability and strength of the agglomerates prepared in the fluid bed.

EXAMPLE 14

This example is presented to further illustrate the effect of process on the properties of agglomerates or granules produced.

In accordance with Duyfjes, U.S. Pat. No. 3,617,246, 125 parts of commercially formulated linuron (Lorox obtained from E. I. du Pont de Nemours and Co., Inc., Wilmington, Del.) containing 50% by weight of the active ingredient 3-(3,4-dichlorophenyl)-1-methoxy-1-methyl urea is thoroughly blended with 1 part of stearic acid to reduce the rate and amount of water adsorption of the untreated formulation. To this mixture is added 6.3 parts of the binder-dispersant of Example 1. After thorough blending, 5% (6.61 parts) of water is added as finely divided droplets while rapidly agitating the dry ingredients. A crumbly mass results. The crumbly mass is pressed into disks, the disks subsequently crushed and granules in the −25 +60 mesh size range recovered as in Example 13. These granules are labeled A.

A second portion of 100 parts of the formulated linuron is charged to the fluidized bed agglomerating apparatus of Example 1 and fluidizing air is admitted at 5 psig and 75°C. 53.6 Parts of the aqueous binder-dispersant solution of Example 13 is admitted through the atomizer. The pressure of the fluidizing air is gradually increased to 35 psig during addition of the binder solution. Fluidization with the air at 75°C is continued for 10 minutes after addition of the solution to dry the agglomerates. The dried agglomerates are screened to recover the −25 +60 mesh size fraction. The agglomerates are labeled B.

The properties of Granules A, and Agglomerates B, are determined to be:

| | Dispersibility Settled Solids ml after 1 min.* | Flow-ability Angle of Repose | Coherence wt% Disintegration | Isodimensionality Long:Short Axis Ratio |
|---|---|---|---|---|
| Granules, A | 1.4 | 38° | 19.0 | 1.7 |
| Agglomerates, B | 0.03 | 35° | 15.0 | 1.4 |

*Test discontinued after 1 min. All suspended solids of Granules A, settled before 1 min.

The results clearly show the superior dispersibility of the agglomerates. The Granules A are not useful for preparing sprayable suspensions.

EXAMPLE 15

One hundred parts of commercially formulated oxamyl nematicide soluble powder containing 90% by weight of methyl N',N'-dimethyl-N-[(methylcarbamoyl)oxy]-1-thiooxamimidate of which 33.6 wt. % passes a 140 mesh screen is placed in the fluid bed agglomerating apparatus of Example 1. The powder is fluidized by admitting air to the fluidizer at 5 psig and 45°C. 27.8 Parts of an aqueous binder-dispersant solution containing 10% by weight of polyvinyl alcohol, (Elvanol 51-05 obtained from E. I. du Pont de Nemours & Co., Inc., Wilmington, Del.) is admitted to the fluidized powder through the atomizer. During addition of the binder-dispersant the fluidizing air pressure is gradually increased to 20 psig. After addition of the binder solution, fluidization is continued for 20 minutes with the air at 45°C to dry the agglomerates. The agglomerates are dust free with 0.9% by weight passing a 140 mesh screen. The agglomerates exhibit an angle of repose of 37.5° and a disintegration of 28.4%. The agglomerates completely dissolve in water at 23°C in one minute.

EXAMPLE 16

One hundred parts of the commercially formulated and ground wettable powder terbacil herbicide "Sinbar" (E. I. du Pont de Nemours and Co., Inc.) containing 80% by weight of 3-tert-butyl-5-chloro-6-methyl uracil is charged to the fluid bed agglomerator of Example 1 and fluidized by applying air at 5 psig and 45°C to the fluidizer. 48.1 Parts of aqueous solution of the partially hydrolyzed polyvinyl acetate binder-dispersant of Example 15 is admitted through the atomizer. The fluidizing air pressure is gradually increased to 30 psig during addition of the binder solution. Fluidization with the air at 75°C is continued for 10 minutes after the binder addition is completed to dry the agglomerates. The dry agglomerates are screened, recovering 74.7% by weight of the agglomerates in the −25 +60 mesh size range, the remainder, 25.3% passes the 60 mesh screen.

The agglomerates show excellent dispersion, with 0.00, <0.01 and <0.01 ml of suspended solids after 1, 3 and 5 minutes settling, respectively. The agglomerates show 29.3% disintegration in the coherence test and an angle of repose of 37.7°.

EXAMPLE 17

Fifteen pounds of technical bromacil containing 98.0% by weight of 5-bromo-3-sec-butyl-6-methyluracil are thoroughly blended with 0.25 lb. of Barden clay and 0.11 lb. of basic magnesium carbonate. The blended mixture is passed through a hammer mill equipped with a herringbone screen with 0.27 inch openings, and the material is thereby converted into a powder substantially all finer than 75 microns. Ten pounds of the hammer-milled mixture is charged to the conical fluidizing section of a Model WSG5 Glatt fluid bed granulator obtained through Chemical and Pharmaceutical Industries Co., Inc., 260 W. Broadway, New York, NY 10013. The mixture is then gently fluidized by admitting air at 50°C. and 28.5 p.s.i.g. (2.01 kg./cm.$^2$) to the fluidizing section.

The binder-dispersant of Example 2 at a concentration of 31 weight percent binder solids and 4.5 weight percent of trimethylnonyl polyethylene glycol ether surfactant is sprayed onto the fluidized solids through the two fluid atomizing nozzles at a rate of 0.135 lb./min. of solution. The nozzle is positioned fifteen inches above the bottom of the conical fluidizing section and directed downwardly. The atomizing air is supplied at 71.3 p.s.i.g. (5.0 kg./cm.$^2$). The binder-dispersant is added intermittently for 15 seconds followed by 105 seconds during which no binder-dispersant is added until a total of 3.076 lbs. of binder solution are added. The dust filters mounted in the upper parts of the disengaging section of the granulator are shaken during the last 5 seconds before each binder solution addition to return the fines to the fluidized solids.

After addition of the binder-dispersant, fluidization is continued with the inlet air temperature at 75°C. When the outlet air temperature achieves 70°C, fluidization is stopped, the fines shaken from the filters and the granulated product removed.

The batch is sifted to recover the portion which passes a 30 mesh screen and is retained on a 60 mesh screen. The portion which is retained on the 30 mesh screen is passed through a Stokes granulator fitted with a 35 mesh screen and screened to recover the fraction retained on a 60 mesh screen and combined with the −30 +60 portion. The total recovery of granules is 6.1 lbs.

The granules exhibit an attrition of 26%, an angle of repose of 37.5° and 0.04 ml. of settled solids in the dispersibility test.

EXAMPLE 18

Five hundred ninety-eight grams of technical methomyl containing 97% by weight of S-methyl N-[(methylcarbamoyl)oxy] thioacetimidate and 27 grams of "Zeolex" fine silica (J. M. Huber Corp., Menlo Park, N.J.) are ground for 15 minutes in a 2-gallon ceramic ball mill containing about 1 gallon of 1 inch dia. × 1 inch long ceramic cylinders as grinding medium. The ground mixture is screened. About 0.1% by weight retained on a 60 mesh U.S. Standard screen is discarded. About 50% by weight of the ground mixture passes a 200 mesh U.S. Standard screen.

One hundred grams of the ground mixture which passes the 60 mesh screen is charged to the fluid bed agglomerator of Example 1 and gently fluidized by admitting air at 52°C to the fluidizing section.

47.5 grams of aqueous binder-dispersant solution containing 1.87% by weight of 50 cp grade hydroxypropyl=methylcellulose ("Methocel" HG 65, obtained from Dow Chemical Co., 2030 Dow Center, Midland, Mich. 48640) is admitted through a DeVilbis No. 152 air atomizing nozzle over a period of 8 minutes. The atomizing air is maintained at 25 psig.

Fluidization is continued for 6 additional minutes after addition of binder-dispersant solution to dry the resulting agglomerates.

99.6 grams of agglomerates are recovered of which 0.5 grams do not pass a 14-mesh U.S. Standard screen and 5.8 grams pass a 60-mesh U.S. Standard screen. Thus 93.3 grams in the −14 +60 mesh size range are recovered.

Dissolution time is 2.3 minutes and attrition loss is 10.0 wt. %. The maximum dimensionality ratio is 1.3 and angle of repose is 30° indicating excellent flowability.

EXAMPLE 19

To 95 grams of commercially formulated metribuzin wettable powder (94% < 44 microns) containing 50% by weight of 4-amino-6-tert-butyl-3-(methylthio-as-triazin-5-(4H)one ("Lexone") is added 2.5 grams of finely ground sucrose and 2.5 grams of the finely ground hydroxypropylmethylcellulose of Example 18. The dry ingredients are thoroughly blended and charged to the conical air expansion chamber of the fluidized bed agglomerator of Example 1. The dry ingredients are gently fluidized by admitting air to the expansion chamber at 5 psig and 25°C.

47.3 grams of water are admitted to the atomizer operating at an atomizing air pressure of 25 psig at a rate of 21.0 g/min. During addition of the water fluidization is maintained by gradually increasing the inlet pressure of the fluidizing air to 15 psig. The water flow is stopped after 2.25 minutes. The fluidizing air temperature is increased to 70°C and fluidization maintained for an additional 15 minutes to dry the agglomerates.

The dried agglomerates are recovered and 58.7 g of granules which pass a 14-mesh and are retained on a 60-mesh screen are retained.

The retained granules show good dispersibility and attrition resistance. Their angle of repose is 35° indicating good flowability.

EXAMPLE 20

1426.0 g of technical product containing 96% by weight of 1,2-cyano-2-methoxyiminoacetyl-3-ethyl urea as active fungicide is blended with 200 g of ammonium sulfate and 2.2 g of fine silica (Cab-O-Sil M-5) in a ribbon blender. The blended materials are passed twice through a hammer mill (Bantam Mikropulverizer) fitted with ⅛ inch herringbone screen to produce a pulverulent mixture of which 100% passes through a 60-mesh screen and 50% passes through a 200-mesh screen. 96 g of the pulverized powder is charged to the air expansion section of the fluidized bed agglomerator of Example 1 and gentlty fluidized by admitting air at 50°C gently the apparatus.

50 g of an aqueous binder dispersant solution containing 2.0% of the hydroxypropylmethylcellulose of Example 18 and 0.3% of the surfactant dioctyl ester of sodium sulfosuccinate (Aerosol OTB obtained from American Cyanamide Co., Industrial Chemicals and Plastics Division, Wayne, NJ) is sprayed through the atomizing nozzle using 25 psig atomizing air at a rate of 2.77 g/min, requiring 18 mins to add the 50 g.

Fluidization is maintained for an additional 15 minutes to dry the agglomerates. The agglomerates are removed and 74.0% of the recovered agglomerates pass through a 14-mesh screen and are retained on a 60-mesh screen. These agglomerates containing 87.5 weight percent active fungicide are free flowing, rapidly soluble and strong, showing an angle of repose of 34°, dissolution time of 1.15 mins. and 16.3% attrition loss.

EXAMPLE 21

A dry mixture containing 93% by weight of technical product (98% active herbicide, 3-cyclohexyl-1-methyl-6-dimethylamino-sym-triazine-2,4(1H,3H)-dione, 4.8% Zeolex 7A silica of Example 18, 1.0% hydroxypropyl=methylcellulose of Example 18, 1.0% sucrose and 0.2% Aerosol OTB of Example 20 are dry-blended and ball-milled as described in Example 18.

50 g of the ball-milled mixture (100% through 60-mesh, 55% through 200 mesh) are charged to the air expansion section of the fluid bed agglomerator of Example 1 and gently fluidized with air at 25°C. Agglomeration is accomplished by admitting a total of 19 g of water in three 6.33 g increments, consisting of three one-minute periods of spraying, separated by one-minute periods of no spraying. Thus, 5 minutes are required to complete addition of the water.

Fluidization is continued for an additional 15 mins with air at 55°–60°C. to dry the agglomerates. The agglomerates are removed and screened to recover 40.8% by weight of agglomerates which pass through a 14-mesh screen and are retained on a 60-mesh screen.

The agglomerates show dissolution time of 1.7 minutes, an angle of repose of 33° and attrition loss of 17.5%.

EXAMPLE 22

A dry mixture consisting of 77.4 weight percent of the complex formed by reacting equimolar quantities of 3-(3,4-dichlorophenyl)-1,1-dimethyl urea and 5-bromo-3-sec.butyl-6-methyl uracil, 4.6 weight percent 3-(3,4-dichlorophenyl)-1,1-dimethyl urea, 3.9 weight percent sodium lignin sulfonate ("Polyfon H", obtained from Westvaco Corp., Polychemicals Dept., North Charleston, SC) 13.1 weight percent sucrose and 1.0 weight percent sodium alkylnaphthalene sulfonate ("Alkanol XC", obtained from E. I. du Pont de Nemours and Company, Dyes & Chemicals Div. Wilmington, DE) is blended and ball-milled to yield a finely ground product containing substantially no material larger than about 150 microns and less than about 6% larger than 44 microns.

100 g of the ground mixture is charged to the fluid bed agglomerator of Example 1 and gently fluidized with air at 25°C. Agglomeration is accomplished by admitting 24.2 g of water to the atomizing nozzle operating with air at 20 psig at a rate of 13.4 g/min. After agglomeration is completed the fluidizing air temperature is raised to 70°C. and fluidization is maintained for 20 minutes to dry the agglomerates. 65.2 g of the dried agglomerates passing through a 20-mesh screen and retained on a 60-mesh screen are recovered.

The granules are strong with an attrition loss of 14.3%, are rapidly dispersible in water and free flowing with an angle of repose of 32°.

EXAMPLE 23

100 g of the ball-milled technical methomyl mixture of Example 18 is charged to the fluid bed agglomerator of Example 1. The material is gently fluidized by admitting air at 25°C.

Agglomeration is accomplished by admitting 53.4 grams of an aqueous solution containing 10 percent by weight of polyvinyl pyrrolidone of molecular weight. 40,000 ("PVPK-30", obtained from GAF Corp., Grasselli, NJ) at 6.35 g/min through the atomizing nozzle operating with air at 25 psig.

Air temperature is increased to 52°C. immediately after binder solution is added and fluidization maintained for an additional ten minutes to dry the agglomerates. 96.5 grams of dried agglomerates passing through a 14-mesh screen and retained on a 60-mesh screen are recovered. Dissolution time of the agglomerates is 2.2 minutes and their attrition loss is 18.3%. Good flowability is shown by an angle of repose of 30°.

EXAMPLE 24

16.7 g of the formulated metribuzin of Example 19 is mixed with 67 g of the clay of Example 11 and are charged to the fluid bed agglomerator of Example 2 and gently fluidized by admitting fluidizing air at 50°C. The fluidized bed of the powder mixture was sprayed with 37.4 g of a nonagglomerating solution containing 44.5% trifluralin, $\alpha,\alpha,\alpha$-trifluoro-2,6-dinitro-N,N-dipropyl=p-toluidine ("Treflan", obtained from Elanco Products, Division of Eli Lilley Company, Indianapolis, Ind.) admitted through the atomizing nozzle at 10 g/min with atomizing air at 25 psig to prepare a dry mixture containing metribuzin:trifluraline ratio of 1:2.

Fluidization is maintained and agglomeration is achieved by admitting 42.5 g of a solution containing 7% sucrose and 3% calcium lignin sulfonate through the atomizing nozzle at 10 g/min. After agglomeration is completed fluidization is maintained for 15 additional minutes to dry the agglomerates. Dried agglomerates passing through a 14-mesh screen and retained on a 60-mesh screen are recovered. The granules containing 8% metribuzin and 16% trifluralin are rapidly dispersed in water, and are strong and free-flowing.

EXAMPLE 25

40 g of the formulated metribuzin of Example 19 are blended with 160 grams of clay of Example 11 and are charged to the fluid bed agglomerator of Example 2, and gently fluidized with air at 50°C. 93 g of formulated alachlor solution containing 43% 2,2-chloro-2',6'-diethyl-N-(methoxy methyl)acetanilide ("Lasso", obtained from Monsanto Co., Agricultural Div., St. Louis, MO) are admitted through the atomizing nozzle operating with atomizing air at 25 psig to prepare a nonagglomerated dry mixture containing a metribuzin:alachlor ratio of 1:2.

100 g of the metribuzin-alachlor-clay mixture are charged to the fluid bed agglomerator, fluidized with air at 25°C., and 29.2 grams of an aqueous binder-dispersant solution containing 2% of the hydroxypropyl=$\lambda$ methylcellulose of Example 12 are admitted through the atomizing nozzle at 10 g/min. After completing the binder solution addition, fluidization is maintained for an additional 15 minutes with fluidizing air temperature raised to 50°C. 36.1 g of dried agglomerates passing through a 14-mesh screen and retained on a 60-mesh screen are recovered. The agglomerates contain 8.2% metribuzin and 16.4% alachlor.

The dried agglomerates rapidly disperse in water and are strong and free-flowing.

We claim:

1. A coherent, free-flowing, water dispersible pesticide-containing aggregate that will pass through a U.S. Standard 10 mesh sieve, and will be retained on a U.S. Standard 140 mesh sieve, consisting essentially of from 0 to 90 percent by weight inert fillers, from 5 to 95 percent by weight of a pesticide, and 0.5 to 40 percent by weight of a water-soluble binder-dispersant which has been aggregated in a fluidized bed.

2. The aggregate of claim 1 wherein the binder-dispersant is a member selected from the group consisting of:

cold-water-soluble polyvinyl alcohol, produced by 86 to 91 mol percent hydrolysis of polyvinyl acetate;
polyvinyl pyrrolidone and its mixtures with sucrose;
methylcellulose and its mixtures with sucrose;
hydroxypropylmethylcellulose and its mixtures with sucrose;
lithium, potassium, sodium, magnesium, calcium, and ammonium salts of lignin sulfonic acids and compositions of such salts also containing 4.5 to 95.5 weight percent of at least one water-soluble carbohydrate selected from the group consisting of water-soluble sucrose, hexose, pentose, polymerized sugars, polysaccharides, degenerated cellulose and hemicellulose; and
mixtures of sucrose with sodium salts of polymerized carboxylic acids, polyoxyethylene ether of polyhydric alcohols which contain from about 10 to about 90 weight percent sucrose.

3. The aggregate of claim 1 wherein the binder-dispersant is a member selected from the group consisting of cold-water-soluble polyvinyl alcohol, produced by 86 to 91 mol percent hydrolysis of polyvinyl acetate having a molecular weight between 15,000 and 90,000;
polyvinyl pyrrolidone having a weight average molecular weight of between 15,000 and 160,000;
mixtures of sucrose with methylcellulose in which the methylcellulose has a weight average molecular weight of between 13,000 and 20,000 and forms 2% solutions in water which have a viscosity of 10–20 centipoises and in which the sucrose portion ranges from 0 to 80 weight percent;
mixtures of sucrose with hydroxypropylmethylcellulose in which the hydroxypropylmethylcellulose has a weight average molecular weight of between 18,000 and 26,000 and in which the sucrose portion ranges from 0 to 80 weight percent;
mixtures of sucrose with a sodium salt of carboxylated polyelectrolyte ("Daxadt" 30) or with a reaction product of glycerol with approximately 26 mols of ethylene oxide ("Ethosperse" G26) in which the sucrose content ranges from about 50 to 90 percent by weight;

commercial unrefined calcium or sodium lignin sulfonate container 18–23 wt % of hexoses and pentoses (largely mannose, glucose, and xylose) and lesser amounts of arabinose, fructose, and galactose) with 5% of polymerized sugar, polysaccharides, degenerated cellulose and hemicellulose; and mixtures of sucrose with sodium and calcium lignin sulfonate, containing from 10 to 90 weight percent of sucrose.

4. The aggregate of claim 1 wherein the binder is a member selected from the group consisting of cold-water-soluble polyvinyl alcohol, produced by 86 to 91 mol percent hydrolysis, having a molecular weight between 18,000 and 25,000;

polyvinyl pyrrolidone having a weight average molecular weight of between 30,000 and 50,000;

mixtures of sucrose with methylcellulose in which the methyl cellulose has a weight average molecular weight of between 13,000 and 16,000 and forms 2% solutions in water which have a viscosity of 10–17 centipoises and in which the sucrose portion ranges from 0 to 80 weight percent;

mixtures of sucrose with hydroxypropylmethylcellulose in which the hydroxypropylmethylcellulose has a weight average molecular weight of between 20,000 and 23,000 and in which the sucrose portion ranges from 0 to 80 weight percent;

commercial undried calcium or sodium lignin sulfonate containing 18–23 weight percent of hexoses and pentoses (largely mannose, glucose, and xylose) and lesser amounts of arabinose, fructose, and galactose) with 5 percent of polymerized sugar polysaccharides, degenerated cellulose and hemicellulose; and mixtures of sucrose with sodium and calcium lignin sulfonate, containing from 10 to 90 weight percent of sucrose.

5. The aggregate of claim 1 wherein the pesticide is bromacil.

6. The aggregate of claim 2 wherein the pesticide is bromacil.

7. The aggregate of claim 3 wherein the pesticide is bromacil.

8. The aggregate of claim 1 wherein the pesticide is diuron.

9. The aggregate of claim 2 wherein the pesticide is diuron.

10. The aggregate of claim 3 wherein the pesticide is diuron.

11. The aggregate of claim 1 wherein the pesticide is bromacil-diuron complex.

12. The aggregate of claim 2 wherein the pesticide is bromacil-diuron complex.

13. The aggregate of claim 3 wherein the pesticide is bromacil-diuron complex.

14. The aggregate of claim 1 wherein the pesticide is methomyl and the binder-dispersant is a member selected from the group consisting of:

polyvinyl alcohol of molecular weight between 15,000 and 90,000 produced by 86–91 mol percent hydrolysis of polyvinyl acetate;

polyvinyl pyrrollidone of molecular weight between 15,000 and 160,000; and mixtures of sucrose with methylcellulose or hydroxypropylmethylcellulose which contain from about 10 to about 90 weight percent sucrose.

15. The aggregate of claim 3 wherein the pesticide is benomyl.

16. The method for making the aggregates of claim 1 in which a finely divided powder containing pesticide is contacted in a fluidized bed with a binder-dispersant selected from the group consisting of cold-water-soluble polyvinyl alcohol, produced by 86 to 91 mol percent hydrolysis of polyvinyl acetate;

polyvinyl pyrrolidone and its mixtures with sucrose;

methylcellulose and its mixtures with sucrose;

hydroxypropylmethylcellulose and its mixtures with sucrose;

lithium, potassium, sodium, magnesium, calcium, and ammonium salts of lignin sulfonic acids and compositions of such salts also containing 4.5 to 95.5 weight percent of at least one water-soluble carbohydrate selected from the group consisting of water-soluble sucrose, hexose, pentose, polymerized sugars, polysaccharides, degenerated cellulose and hemicellulose; and mixtures of sucrose with sodium salts of polymerized carboxylic acids, polyoxyethylene ester of polyhydric alcohols which contain from about 10 to about 90 weight percent sucrose;

and that water be sprayed onto the fluidized solids to effect agglomeration, followed by drying the agglomerates in the bed by continuing the flow of the fluidized gas stream, removing the dry agglomerates and separating agglomerates of the desired size range.

* * * * *